(12) United States Patent
Uensal et al.

(10) Patent No.: US 7,736,779 B2
(45) Date of Patent: Jun. 15, 2010

(54) PROTON-CONDUCTING POLYMER MEMBRANE CONTAINING POLYAZOLE BLENDS, AND APPLICATION THEREOF IN FUEL CELLS

(75) Inventors: Oemer Uensal, Mainz (DE); Joachim Kiefer, Losheim Am See (DE); Gordon Calundann, North Plainfield, NJ (US); Michael J. Sansone, Berkeley Heights, NJ (US); Brian Benicewicz, Loudonville, NY (US); Eui W. Choe, Randolph, NJ (US)

(73) Assignee: BASF Fuel Cell (DE)

( * ) Notice: Subject to any disclaimer, the term of this patent is extended or adjusted under 35 U.S.C. 154(b) by 1132 days.

(21) Appl. No.: 10/530,226

(22) PCT Filed: Oct. 2, 2003

(86) PCT No.: PCT/EP03/10905

§ 371 (c)(1),
(2), (4) Date: Aug. 26, 2005

(87) PCT Pub. No.: WO2004/034500

PCT Pub. Date: Apr. 22, 2004

(65) Prior Publication Data

US 2006/0078774 A1   Apr. 13, 2006

(30) Foreign Application Priority Data

Oct. 4, 2002   (DE) ................. 102 46 461

(51) Int. Cl.
H01M 8/10   (2006.01)

(52) U.S. Cl. ............... 429/33; 429/30; 429/42; 521/27; 524/500; 525/411; 528/171; 528/337

(58) Field of Classification Search ............ 429/33, 429/30, 42; 521/27; 524/500; 525/411; 528/171, 337
See application file for complete search history.

(56) References Cited

U.S. PATENT DOCUMENTS 3,692,569 A    9/1972   Grot (Continued)

FOREIGN PATENT DOCUMENTS

DE    44 22 158    1/1996

(Continued)

*Primary Examiner*—Peter D. Mulcahy
*Assistant Examiner*—Henry Hu
(74) *Attorney, Agent, or Firm*—Connolly Bove Lodge & Hutz LLP

(57) ABSTRACT

The present invention relates to a proton-conducting polymer membrane which comprises polyazole blends and is obtainable by a process comprising the steps A) preparation of a mixture comprising polyphosphoric acid, at least one polyazole (polymer A) and/or one or more compounds which are suitable for forming polyazoles under the action of heat according to step B), B) heating of the mixture obtainable according to step A) under inert gas to temperatures of up to 400° C., C) application of a layer using the mixture from step A) and/or B) to a support, D) treatment of the membrane formed in step C) until it is self-supporting, wherein at least one further polymer (polymer B) which is not a polyazole is added to the composition obtainable according to step A) and/or step B) and the weight ratio of polyazole to polymer B is in the range from 0.1 to 50.

27 Claims, 1 Drawing Sheet

U.S. PATENT DOCUMENTS

| | | | |
|---|---|---|---|
| 4,141,800 A * | 2/1979 | Breuer et al. | 205/779.5 |
| 4,191,618 A | 3/1980 | Coker et al. | |
| 4,212,714 A | 7/1980 | Coker et al. | |
| 4,333,805 A | 6/1982 | Davidson et al. | |
| 4,453,991 A | 6/1984 | Grot | |
| 4,634,530 A | 1/1987 | Kuder et al. | |
| 4,997,892 A | 3/1991 | Sansone et al. | |
| 5,422,411 A | 6/1995 | Wei et al. | |
| 5,525,436 A | 6/1996 | Savinell et al. | |
| 5,635,041 A | 6/1997 | Bahar et al. | |
| 5,656,386 A | 8/1997 | Scherer et al. | |
| 5,834,523 A | 11/1998 | Steck et al. | |
| 5,834,566 A | 11/1998 | Helmer-Metzmann et al. | |
| 6,110,616 A | 8/2000 | Sheikh-Ali et al. | |
| 6,242,123 B1 | 6/2001 | Nezu et al. | |
| 6,335,419 B2 * | 1/2002 | Matsuoka et al. | 528/183 |
| 6,632,847 B1 | 10/2003 | Soczka-Guth et al. | |
| 6,723,757 B1 | 4/2004 | Kerres et al. | |
| 6,790,931 B2 | 9/2004 | Cui et al. | |
| 6,869,980 B2 * | 3/2005 | Cui | 521/27 |
| 7,235,320 B2 * | 6/2007 | Calundann et al. | 429/30 |
| 7,332,530 B2 | 2/2008 | Kiefer et al. | |
| 7,540,984 B2 * | 6/2009 | Calundann et al. | 264/41 |
| 2004/0062969 A1 * | 4/2004 | Sakaguchi et al. | 429/33 |
| 2004/0096734 A1 | 5/2004 | Calundann et al. | |
| 2004/0127588 A1 * | 7/2004 | Calumdann et al. | 521/27 |
| 2004/0262227 A1 | 12/2004 | Kiefer et al. | |
| 2005/0053820 A1 * | 3/2005 | Calundann et al. | 429/33 |
| 2005/0074654 A1 | 4/2005 | Kiefer et al. | |
| 2005/0084727 A1 | 4/2005 | Kiefer et al. | |
| 2005/0118477 A1 | 6/2005 | Kiefer et al. | |
| 2005/0118478 A1 | 6/2005 | Kiefer et al. | |
| 2005/0147859 A1 | 7/2005 | Kiefer et al. | |
| 2005/0175879 A1 | 8/2005 | Kiefer et al. | |
| 2005/0181254 A1 | 8/2005 | Uensal et al. | |
| 2005/0244694 A1 | 11/2005 | Kiefer et al. | |
| 2005/0244695 A1 * | 11/2005 | Kiefer et al. | 429/33 |
| 2005/0256296 A1 | 11/2005 | Kiefer et al. | |
| 2006/0008690 A1 * | 1/2006 | Uensal et al. | 429/33 |
| 2006/0035095 A1 * | 2/2006 | Calundann et al. | 428/473.5 |
| 2006/0057449 A1 | 3/2006 | Calundann et al. | |
| 2006/0079392 A1 | 4/2006 | Baurmeister et al. | |
| 2006/0166067 A1 | 7/2006 | Kiefer et al. | |
| 2006/0183012 A1 | 8/2006 | Uensal et al. | |
| 2006/0210881 A1 | 9/2006 | Calundann et al. | |
| 2006/0234099 A1 | 10/2006 | Muellen | |
| 2007/0102361 A1 | 5/2007 | Kiefer et al. | |
| 2007/0292734 A1 | 12/2007 | Kiefer et al. | |
| 2008/0026277 A1 | 1/2008 | Peterson et al. | |
| 2008/0038624 A1 | 2/2008 | Belack et al. | |

FOREIGN PATENT DOCUMENTS

| | | |
|---|---|---|
| DE | 195 27 435 | 1/1997 |
| DE | 198 44 645 | 4/1999 |
| DE | 198 17 374 | 10/1999 |
| DE | 198 51 498 | 7/2000 |
| DE | 199 59 289 | 6/2001 |
| EP | 0 667 983 | 8/1995 |
| WO | WO-96/01177 | 1/1996 |
| WO | WO-96/13872 | 5/1996 |
| WO | WO-00/15691 | 3/2000 |
| WO | WO-01/18894 | 3/2001 |
| WO | WO 02/088219 | 11/2002 |
| WO | WO-2004/034500 A2 * | 4/2004 |
| WO | WO 2006/117199 | 11/2006 |

* cited by examiner

US 7,736,779 B2

PROTON-CONDUCTING POLYMER MEMBRANE CONTAINING POLYAZOLE BLENDS, AND APPLICATION THEREOF IN FUEL CELLS

RELATED APPLICATIONS

This application is a national stage application (under 35 U.S.C. 371) of PCT/EP2003/010905 filed Oct. 2, 2003 which claims benefit German application 102 46 461.8 filed Oct. 4, 2002.

The present invention relates to a proton-conducting polymer electrolyte membrane which comprises polyazole blends and can, owing to its excellent chemical and thermal properties, be used for a variety of purposes, in particular as polymer electrolyte membrane (PEM) in PEM fuel cells.

A fuel cell usually comprises an electrolyte and two electrodes separated by the electrolyte. In the case of a fuel cell, a fuel such as hydrogen gas or a methanol/water mixture is supplied to one of the two electrodes and an oxidant such as oxygen gas or air is supplied to the other electrode and chemical energy from the oxidation of the fuel is in this way converted directly into electric energy. The oxidation reaction forms protons and electrons.

The electrolyte is permeable to hydrogen ions, i.e. protons, but not to reactive fuels such as the hydrogen gas or methanol and the oxygen gas.

A fuel cell generally comprises a plurality of single cells known as MEUs (membrane-electrode units) which each comprise an electrolyte and two electrodes separated by the electrolyte.

Electrolytes employed for the fuel cell are solids such as polymer electrolyte membranes or liquids such as phosphoric acid. Recently, polymer electrolyte membranes have attracted attention as electrolytes for fuel cells. In principle, a distinction can be made between two categories of polymer membranes.

The first category encompasses cation-exchange membranes comprising a polymer framework containing covalently bound acid groups, preferably sulfonic acid groups. The sulfonic acid group is converted into an anion with release of a hydrogen ion and therefore conducts protons. The mobility of the proton and thus the proton conductivity is linked directly to the water content. Due to the very good miscibility of methanol and water, such cation-exchange membranes have a high methanol permeability and are therefore unsuitable for use in a direct methanol fuel cell. If the membrane dries, e.g. as a result of a high temperature, the conductivity of the membrane and consequently the power of the fuel cell decreases drastically. The operating temperatures of fuel cells containing such cation-exchange membranes are thus limited to the boiling point of water. Moistening of the fuels represents a great technical challenge for the use of polymer electrolyte membrane fuel cells (PEM-FCs) in which conventional, sulfonated membranes such as Nafion are used. Materials used for polymer electrolyte membranes are, for example, perfluorosulfonic acid polymers. The perfluorosulfonic acid polymer (e.g. Nafion) generally has a perfluorinated hydrocarbon skeleton such as a copolymer of tetrafluoroethylene and trifluorovinyl and a side chain bearing a sulfonic acid group, e.g. a side chain bearing a sulfonic acid group bound to a perfluoroalkylene group, bound thereto.

The cation-exchange membranes are preferably organic polymers having covalently bound acid groups, in particular sulfonic acid. Processes for the sulfonation of polymers are described in F. Kucera et al. Polymer Engineering and Science 1988, Vol. 38, No. 5, 783-792.

The most important types of cation-exchange membranes which have achieved commercial importance for use in fuel cells are listed below: the most important representative is the perfluorosulfonic acid polymer Nafion® (U.S. Pat. No. 3,692,569). This polymer can, as described in U.S. Pat. No. 4,453,991, be brought into solution and then used as ionomer. Cation-exchange membranes are also obtained by filling a porous support material with such an ionomer. As support material, preference is given to expanded Teflon (U.S. Pat. No. 5,635,041).

A further perfluorinated cation-exchange membrane can be produced as described in U.S. Pat. No. 5,422,411 by copolymerization of trifluorostyrene and sulfonyl-modified trifluorostyrene. Composite membranes comprising a porous support material, in particular expanded Teflon, filled with ionomers consisting of such sulfonyl-modified trifluorostyrene copolymers are described in U.S. Pat. No. 5,834,523. U.S. Pat. No. 6,110,616 describes copolymers of butadiene and styrene and their subsequent sulfonation to produce cation-exchange membranes for fuel cells.

A further class of partially fluorinated cation-exchange membranes can be produced by radiation grafting and subsequent sulfonation. Here, a grafting reaction, preferably using styrene, is carried out on a previously radiated polymer film as described in EP667983 or DE19844645. The side chains are then sulfonated in a subsequent sulfonation reaction. A crosslinking reaction can also be carried out simultaneously with the grafting reaction and the mechanical properties can be altered in this way. Apart from the above membranes, a further class of nonfluorinated membranes produced by sulfonation of high-temperature-stable thermoplastics has been developed. Thus, membranes composed of sulfonated polyether ketones (DE4219077, EP96/01177), sulfonated polysulfone (J. Membr. Sci. 83 (1993) p. 211) or sulfonated polyphenylene sulfide (DE19527435) are known Ionomers prepared from sulfonated polyether ketones are described in WO 00/15691.

Furthermore, acid-base blend membranes which are produced as described in DE19817374 or WO 01/18894 by mixing sulfonated polymers and basic polymers are known.

To improve the membrane properties further, a cation-exchange membrane known from the prior art can be mixed with a high-temperature-stable polymer. The production and properties of cation-exchange membranes comprising blends of sulfonated PEK and a) polysulfones (DE4422158), b) aromatic polyamides (42445264) or c) polybenzimidazole (DE19851498) have been described.

However, a problem associated with such membranes is their complicated and thus expensive production, since it is usual firstly to form various polymers which are subsequently cast, frequently with the aid of a solvent, to produce a film. To prepare the sulfonated polymers, the PEK is usually dissolved in a suitable solvent and subsequently reacted with an aggressive sulfonating reagent, for example oleum or chlorosulfonic acid. This reaction is relatively critical, since the sulfonating reagent is a strong oxidizing agent so that degradation of the PEK cannot be ruled out. This would, in particular, have an adverse effect on the mechanical properties of the polymer. The sulfonated polymer is isolated and converted into the neutral form in a further process step. The polymer is then brought into solution again. A polymer film can, inter alia, be cast from this solution. The solvent used for this purpose, for example N-dimethylacetamide, subsequently has to be removed. Accordingly, the process for producing such membranes is complicated and therefore expensive.

Uncontrolled sulfonation at many points on the polymer takes place in the sulfonation processes using very strong sulfonating agents. The sulfonation can also lead to chain rupture and thus to a worsening of the mechanical properties and finally to premature failure of the fuel cells.

Sulfonated polybenzimidazoles are also known from the literature. Thus, U.S. Pat. No. 4,634,530 describes sulfonation of an undoped polybenzimidazole film by means of a sulfonating agent such as sulfuric acid or oleum in the temperature range up to 100° C.

Furthermore, Staiti et al. (P. Staiti in J. Membr. Sci. 188 (2001) 71) have described the preparation and properties of sulfonated polybenzimidazoles. It was in this case not possible to carry out the sulfonation on the polymer in the solution. Addition of the sulfonating agent to the PBI/DMAc solution results in precipitation of the polymer. To carry out the sulfonation, a PBI film was produced first and this was dipped into a dilute sulfuric acid. The samples were then treated at temperatures of about 475° C. for 2 minutes to effect sulfonation. The sulfonated PBI membranes have a maximum conductivity of only $7.5*10^{-5}$ S/cm at a temperature of 160° C. The maximum ion exchange capacity is 0.12 meq/g. It was likewise shown that such sulfonated PBI membranes are not suitable for use in a fuel cell.

The production of sulfoalkylated PBI membranes by reacting a hydroxyethyl-modified PBI with a sultone is described in U.S. Pat. No. 4,997,892. On the basis of this technology, it is possible to produce sulfopropylated PBI membranes (Sanui et al. in Polym. Adv. Techn. 11 (2000) 544). The proton conductivity of such membranes is $10^{-3}$ S/cm and is thus too low for use in fuel cells in which 0.1 S/cm is sought.

A disadvantage of all these cation-exchange membranes is the fact that the membrane has to be moistened, the operating temperature is limited to 100° C. and the membranes have a high methanol permeability. The reason for these disadvantages is the conductivity mechanism of the membrane, in which the transport of the protons is coupled to the transport of the water molecule. This is referred to as the "vehicle mechanism" (K.-D. Kreuer, Chem. Mater. 1996, 8, 610-641).

As a second category, polymer electrolyte membranes comprising complexes of basic polymers and strong acids have been developed. Thus, WO 96/13872 and the corresponding U.S. Pat. No. 5,525,436 describe a process for producing a proton-conducting polymer electrolyte membrane, in which a basic polymer such as polybenzimidazole is treated with a strong acid such as phosphoric acid, sulfuric acid, etc.

*J. Electrochem. Soc.*, volume 142, No. 7, 1995, pp. L121-L123, describes doping of a polybenzimidazole in phosphoric acid.

In the case of the basic polymer membranes known from the prior art, the mineral acid used for achieving the required proton conductivity (usually concentrated phosphoric acid) is usually added to the polyazole film after shaping. The polymer in this case serves as support for the electrolyte comprising the highly concentrated phosphoric acid. The polymer membrane performs further important functions; in particular, it has to have a high mechanical stability and serve as separator for the two fuels mentioned above.

A significant advantage of such a membrane doped with phosphoric acid is the fact that a fuel cell in which such a polymer electrolyte membrane is used can be operated at temperatures above 100° C. without the moistening of the fuels which is otherwise necessary. This is due to the ability of phosphoric acid to transfer protons without additional water by means of the Grotthus mechanism (K.-D. Kreuer, Chem. Mater. 1996, 8, 610-641).

The possibility of operation at temperatures above 100° C. results in further advantages for the fuel cell system. Firstly, the sensitivity of the Pt catalyst to impurities in the gas, in particular CO, is greatly reduced. CO is formed as by-product in the reforming of the hydrogen-rich gas comprising hydrocarbon-containing compounds, e.g. natural gas, methanol or petroleum spirit, or as intermediate in the direct oxidation of methanol. The CO content of the fuel typically has to be less than 100 ppm at temperatures of <100° C. However, at temperatures in the range 150-200°, 10000 ppm or more of CO can also be tolerated (N. J. Bjerrum et al. Journal of Applied Electrochemistry, 2001, 31, 773-779). This leads to significant simplifications of the upstream reforming process and thus to cost reductions for the total fuel cell system.

A great advantage of fuel cells is the fact that the electrochemical reaction converts the energy of the fuel directly into electric energy and heat. Water is formed as reaction product at the cathode. Heat is thus generated as by-product in the electrochemical reaction. In the case of applications in which only the electric power is utilized for driving electric motors, e.g. in automobile applications, or as replacement for battery systems in many applications, the heat has to be removed in order to avoid overheating of the system. Additional, energy-consuming equipment is then necessary for cooling, and this further reduces the total electrical efficiency of the fuel cell. In the case of stationary applications such as central or decentralized generation of power and heat, the heat can be utilized efficiently by means of existing technologies, e.g. heat exchangers. High temperatures are sought here to increase the efficiency. If the operating temperature is above 100° C. and the temperature difference between ambient temperature and the operating temperature is large, it is possible to cool the fuel cell system more efficiently or employ small cooling areas and dispense with additional equipment compared to fuel cells which have to be operated at below 100° C. because of the moistening of the membrane.

However, besides these advantages, such a fuel cell system also has disadvantages. Thus, the durability of the membranes doped with phosphoric acid is relatively limited. The life is, in particular, significantly reduced by operation of the fuel cell at below 100° C., for example at 80° C. However, it needs to be noted in this regard that the cell has to be operated at these temperatures on start-up and shutdown of the fuel cell.

Furthermore, the production of membranes doped with phosphoric acid is relatively expensive since it is usual firstly to form a polymer which is subsequently cast with the aid of a solvent to produce a film. After the film has been dried, it is doped with an acid in a final step. The polymer membranes known hitherto therefore have a high concentration of dimethylacetamide (DMAc) which cannot be removed completely by means of known drying methods.

In addition, the performance, for example the conductivity, of known membranes is in need of improvement.

Furthermore, the mechanical stability of known high-temperature membranes having a high conductivity is in need of improvement.

It is therefore an object of the present invention to provide a novel polymer electrolyte membrane which achieves the abovementioned objects. In particular, a membrane according to the invention should be able to be produced inexpensively and simply. Another object of the present invention is to provide polymer electrolyte membranes which have good performance, in particular a high conductivity over a wide temperature range. Here, the conductivity should, in particular at high temperatures, be achieved without additional moistening. The membrane should have a high mechanical stability relative to its performance.

Furthermore, the operating temperature should be able to be extended to the range from <80° C. to 200° C. without the life of the fuel cell being greatly reduced.

These objects are achieved by a proton-conducting polymer membrane comprising polyazole blends and having all the features of claim 1.

Figure 1:
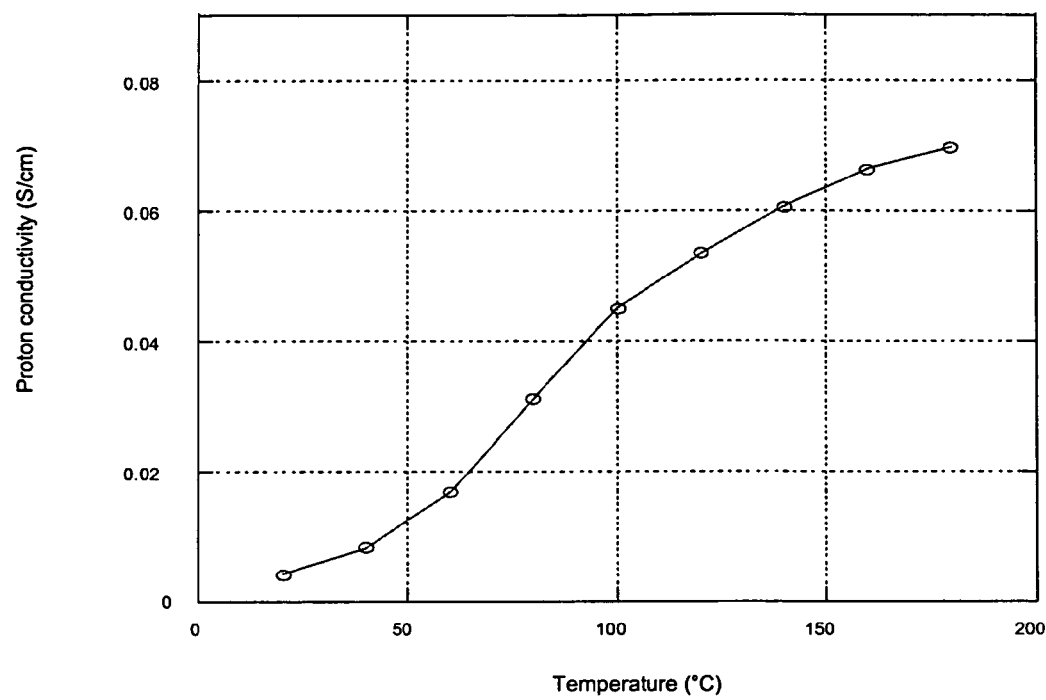
FIG. 1 shows the conductivity of the membrane produced according to the invention.

A membrane according to the invention displays a high conductivity over a wide temperature range and this is achieved even without additional moistening. A membrane according to the invention displays a relatively high mechanical stability. Furthermore, a membrane according to the invention can be produced simply and inexpensively. Thus, in particular, large amounts of expensive solvents such as dimethylacetamide can be dispensed with.

Furthermore, these membranes have a surprisingly long life. In addition, a fuel cell equipped with a membrane according to the invention can also be operated at low temperatures, for example at 80° C., without the life of the fuel cell being greatly reduced thereby.

The present invention provides a proton-conducting polymer membrane which comprises polyazole blends and is obtainable by a process comprising the steps A) preparation of a mixture comprising polyphosphoric acid, at least one polyazole (polymer A) and/or one or more compounds which are suitable for forming polyazoles under the action of heat according to step B), B) heating of the mixture obtainable according to step A) under inert gas to temperatures of up to 400° C.

C) application of a layer using the mixture from step A) and/or B) to a support, D) treatment of the membrane formed in step C) until it is self-supporting, wherein at least one further polymer (polymer B) which is not a polyazole is added to the composition obtainable according to step A) and/or step B) and the weight ratio of polyazole to polymer B is in the range from 0.1 to 50.

The composition prepared according to step B) comprises polyazoles. These polymers can have been added in step A), but they can also be obtained from the monomers, oligomers and/or prepolymers on which the polymer is based during the heating in step B).

Polymers based on polyazole comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII).

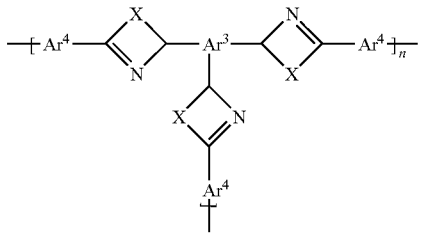
(I)

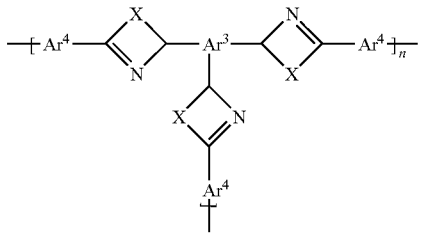
(II)

-continued

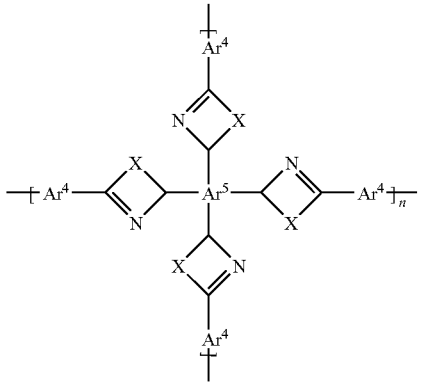
(III)

(IV)

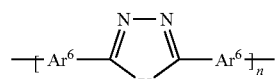
(V)

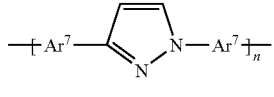
(VI)

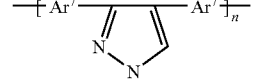
(VII)

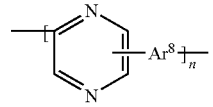
(VIII)

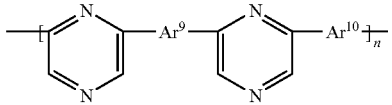
(IX)

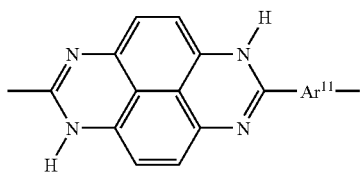
(X)

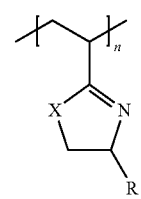
(XI)

(XII) 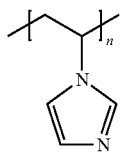

(XIII) 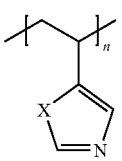

(XIV) 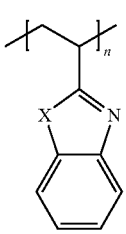

(XV) 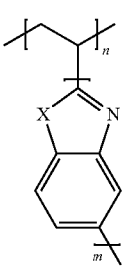

(XVI) 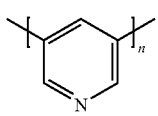

(XVII) 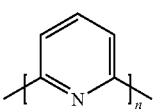

(XVIII) 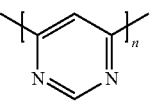

(XIX) 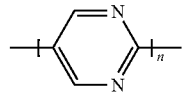

(XX) 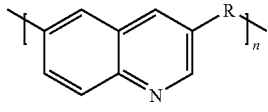

(XXI) 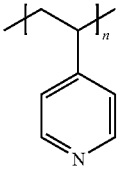

(XXII) 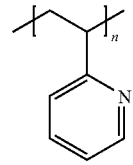

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, preferably a branched or unbranched alkyl or alkoxy group, or an aryl group as further radical,
the radicals R are identical or different and are each hydrogen, an alkyl group or an aromatic group and
n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyidimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyloxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b] thiophene, benzo[b] furan, indole, benzo[c] thiophene, benzo[c] furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pheridine or quinolizine, 4H-quinolizine, diphenyl ether, anthracene, benzopyrrole, benzoxathiadiazole, benzoxadiazole, benzopyridine, benzopyrazine, benzopyrazidine, benzopyrimidine, benzotriazine, indolizine, pyridopyridine, imidazopyrimidine, pyrazinopyrimidine, carbazole, acridine, phenazine, benzoquinoline, phenoxazine, phenothiazine, acrdizine, benzopteridine, phenanthroline and phenanthrene, which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further, preferred polyazole polymers are polyimidazoles, polybenzothiazoles, polybenzoxazoles, polyoxadiazoles, polyquinoxalines, polythiadiazoles, poly-(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole comprising only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

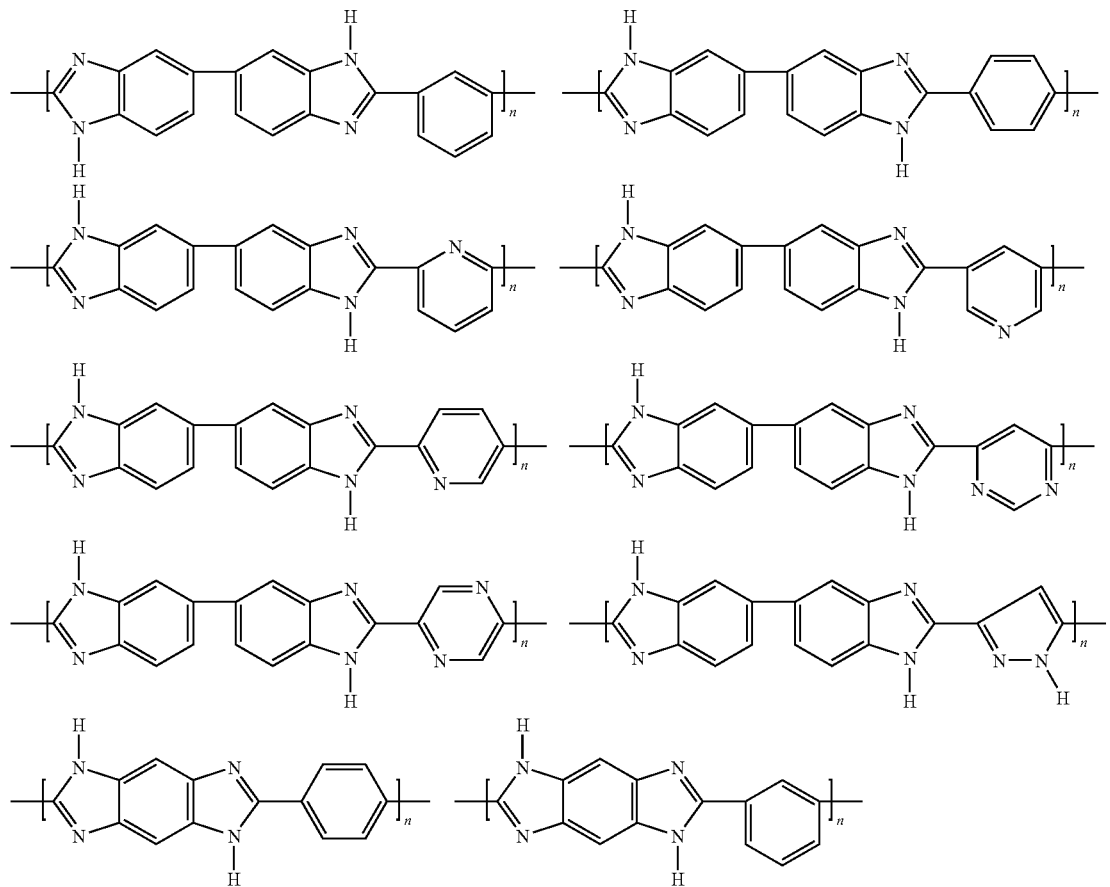

-continued

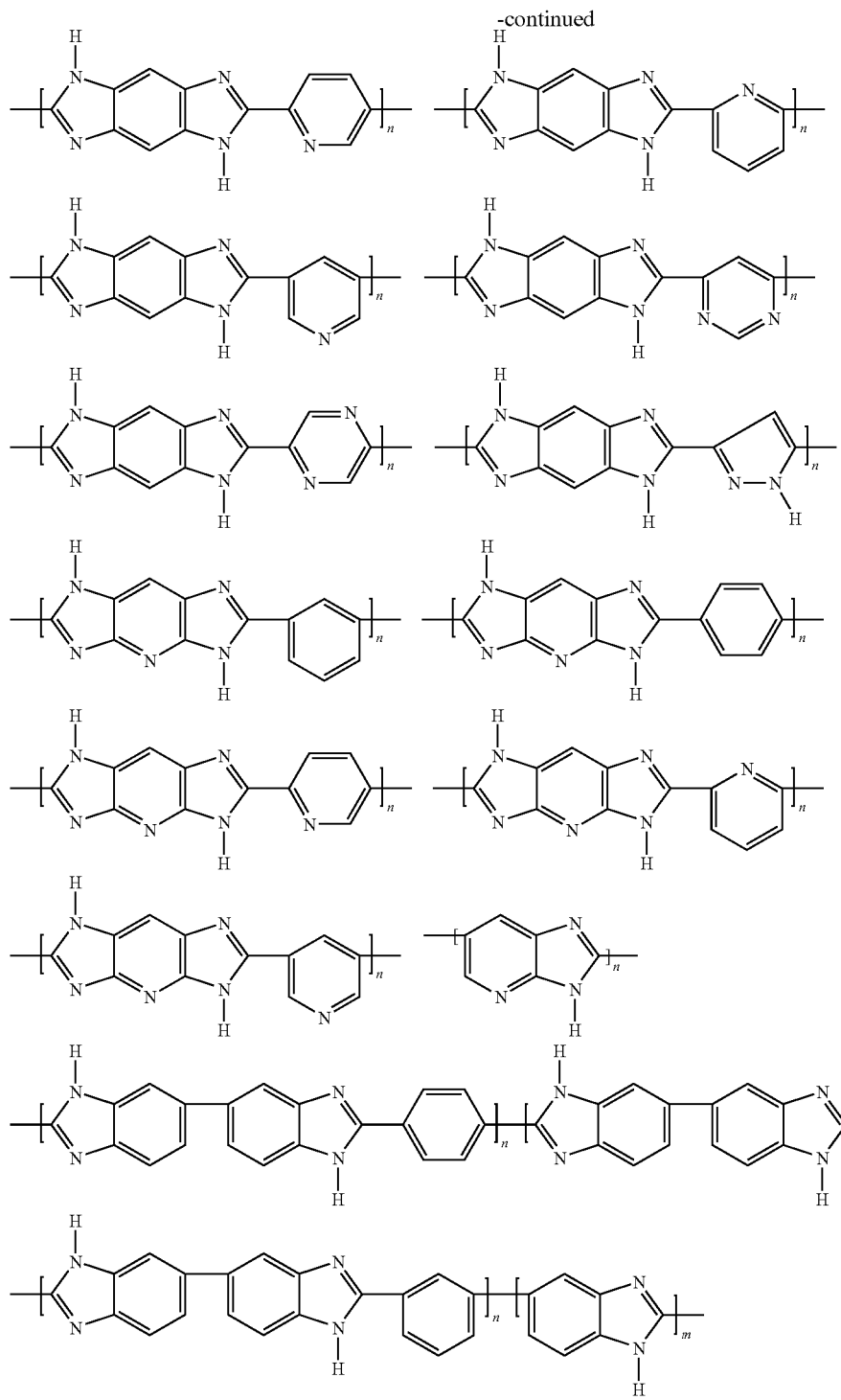

where n and m are each an integer greater than or equal to 10, preferably greater or equal to 100.

The polyazoles used in step A), but in particular the polybenzimidazoles, have a high molecular weight. Measured as intrinsic viscosity, it is preferably in the range from 0.3 to 10 dl/g, in particular from 1 to 5 dl/g.

Furthermore, the polyazoles can also be prepared by heating in step B). For this purpose, one or more compounds which are suitable for forming polyazoles under the action of heat according to step B) can be added to the mixture in step A).

Mixtures comprising one or more aromatic and/or heteroaromatic tetraamino compounds and one or more aromatic and/or heteroaromatic carboxylic acids or derivatives thereof which have at least two acid groups per carboxylic acid monomer are suitable for this purpose. It is also possible to use one or more aromatic and/or heteroaromatic diaminocarboxylic acids for the preparation of polyazoles.

The aromatic and heteroaromatic tetraamino compounds include, inter alia, 3,3',4,4'-tetraaminobiphenyl, 2,3,5,6-tetraaminopyridine, 1,2,4,5-tetraaminobenzene, bis(3,4-diaminophenyl)sulfone, bis(3,4-diaminophenyl) ether, 3,3',4,4'-tetra-aminobenzophenone, 3,3',4,4'-tetraaminodiphenylmethane and 3,3',4,4'-tetraaminodiphenyldimethylmethane and their salts, in particular their monohydrochloride, dihydrochloride, trihydrochloride and tetrahydrochloride derivatives. Among these, 3,3',4,4'-tetraaminobiphenyl, 2,3,5,6-tetraaminopyridine and 1,2,4,5-tetraaminobenzene are particularly preferred.

Furthermore, the mixture A) can comprise aromatic and/or heteroaromatic carboxylic acids. These are dicarboxylic acids, tricarboxylic acids and tetracarboxylic acids or their esters or their anhydrides or their acid halogenides, in particular their acid halogenides and/or acid bromides. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-dicarboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or acid chlorides.

The aromatic tricarboxylic acids or their C1-C20-alkyl esters or C5-C12-aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20-alkyl esters, C5-C12-aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are heteroaromatic dicarboxylic acids and tricarboxylic acids and tetracarboxylic acids or their esters or their anhydrides. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

The content of tricarboxylic acids or tetracarboxylic acids (based on dicarboxylic acid used) is in the range from 0 to 30 mol %, preferably from 0.1 to 20 mol %, in particular from 0.5 to 10 mol %.

Furthermore, the mixture A) can also comprise aromatic and heteroaromatic diaminocarboxylic acids. These include, inter alia, diaminobenzoic acid, 4-phenoxycarbonylphenyl-3',4'-diaminophenyl ether and their monochloride and dihydrochloride derivatives.

Mixtures of at least 2 different aromatic carboxylic acids are preferably used in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1.

These mixtures are, in particular, mixtures of N-heteroaromatic dicarboxylic acids and aromatic dicarboxylic acids. Nonlimiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethyl-phthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a very high molecular weight is to be achieved, the molar ratio of carboxylic acid groups to amino groups in the reaction of tetraamino compounds with one or more aromatic carboxylic acids or esters thereof having at least two acid groups per carboxylic acid monomer is preferably in the vicinity of 1:2.

The mixture prepared in step A) preferably comprises at least 0.5% by weight, in particular from 1 to 30% by weight and particularly preferably from 2 to 15% by weight, of monomers for the preparation of polyazoles.

If the polyazoles are prepared from the monomers directly in the polyphosphoric acid, the polyazoles have a high molecular weight. This applies particularly to the polybenzimidazoles. Measured as intrinsic viscosity, it is in the range from 0.3 to 10 dl/g, preferably from 1 to 5 dl/g.

If tricarboxylic acids or tetracarboxylic acids are also present in the mixture in step A), branching/crosslinking of the polymer formed is achieved in this way. This contributes to an improvement in the mechanical properties.

In a further embodiment of the present invention, the mixture prepared in step A) comprises compounds which are suitable for forming polyazoles under the action of heat in step B) these compounds can be obtained by reaction of one or more aromatic and/or heteroaromatic tetraamino compounds with one or more aromatic and/or heteroaromatic carboxylic acids or derivatives thereof containing at least two acid groups per carboxylic acid monomer or of one or more aromatic and/or heteroaromatic diaminocarboxylic acids in the melt at temperatures of up to 400° C., in particular up to 350° C., preferably up to 280° C. The compounds to be used for preparing these prepolymers have been described above.

The polyphosphoric acid used in step A) is a commercial polyphosphoric acid as can be obtained, for example, from Riedel-de Haen. The polyphosphoric acids $H_{n+2}P_nO_{3n+1}$ (n>1) usually have an assay calculated as $P_2O_5$ (acidimetric) of at least 83%. In place of a solution of the monomers, it is also possible to produce a dispersion/suspension.

According to the invention, at least one further polymer which is not a polyazole (polymer B) is added to the composition produced in step A) and/or step B). This polymer can be present, inter alia, in dissolved, dispersed or suspended form.

Here, the weight ratio of polyazole to polymer (B) is in the range from 0.1 to 50, preferably from 0.2 to 20, particularly preferably from 1 to 10. If the polyazole is not formed until step B), the weight ratio can be calculated from the weight of the monomers for forming the polyazole, taking the compounds liberated in the condensation, for example water, into account.

Preferred polymers include, inter alia, polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular ones derived from norbornene; polymers having C—O bonds in the main chain, for example polyacetal, polyoxymethylene, polyether, polypropylene oxide, polyepichlorohydrin, poly-tetrahydrofuran, polyphenylene oxide, polyether ketone, polyesters, in particular polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate; polymers having C—S bonds in the main chain, for example polysulfide ether, polyphenylene sulfide, polyether sulfone; polymers having C—N bonds in the main chain, for example polyimines, polyisocyanides, polyetherimine, polyaniline, polyamides, polyhydrazides, polyurethanes, polyimides, polyazoles, polyazines; liquid-crystalline polymers, in particular Vectra, and inorganic polymers, for example polysilanes, polycarbosilanes, polysiloxanes, polysilicic acid, polysilicates, silicones, polyphosphazenes and polythiazyl.

Furthermore, the polymers (B) also comprise polymers having covalently bound acid groups. These acid groups encompass, in particular, sulfonic acid groups. The polymers modified with sulfonic acid groups preferably have a content of sulfonic acid groups in the range from 0.5 to 3 meq/g. This value is determined via the ion exchange capacity (IEC).

To measure the IEC, the sulfonic acid groups are converted into the free acid. For this purpose, the polymer is treated with acid in a known manner and excess acid is removed by washing. Thus, the sulfonated polymer is treated in boiling water for 2 hours. Excess water is subsequently dabbed off and the sample is dried at 160° C. at p<1 mbar in a vacuum drying oven for 15 hours. The dry weight of the membrane is then determined. The polymer which has been dried in this way is then dissolved in DMSO at 80° C. over a period of 1 hour. The solution is subsequently titrated with 0.1 M NaOH. The ion exchange capacity (IEC) is then calculated from the consumption of acid to the equivalence point and the dry weight.

Such polymers are known to those skilled in the art. Thus, polymers containing sulfonic acid groups can be prepared, for example, by sulfonation of polymers. Processes for the sulfonation of polymers are described in F. Kucera et al. Polymer Engineering and Science 1988, Vol. 38, No. 5, 783-792. Here, the sulfonation conditions can be chosen so that a low degree of sulfonation is obtained (DE-A-19959289).

A further class of nonfluorinated polymers obtained by sulfonation of high-temperature-stable thermoplastics has been developed in this way. Thus, sulfonated polyether ketones (DE-A-4219077, WO96/01177), sulfonated polysulfones (J. Membr. Sci. 83 (1993) p. 211) or sulfonated polyphenylene sulfide (DE-A-19527435) are known.

U.S. Pat. No. 6,110,616 describes copolymers of butadiene and styrene and their subsequent sulfonation for use in fuel cells.

Furthermore, such polymers can also be obtained by polymerization reactions of monomers having acid groups. Thus, perfluorinated polymers can be obtained as described in U.S. Pat. No. 5,422,411 by copolymerization of trifluorostyrene and sulfonyl-modified trifluorostyrene.

These perfluorosulfonic acid polymers include, inter alia, Nafion® (U.S. Pat. No. 3,692,569). This polymer can, as described in U.S. Pat. No. 4,453,991, be brought into solution and then used as ionomer.

Preferred polymers having acid groups include, inter alia, sulfonated polyether ketones, sulfonated polysulfones, sulfonated polyphenylene sulfides, perfluorinated polymers containing sulfonic acid groups, as described in U.S. Pat. Nos. 3,692,569, 5,422,411 and 6,110,616.

For use in fuel cells having a long-term operating temperature above 100° C., preference is given to polymers (B) which have a glass transition temperature or Vicat softening temperature VST/A/50 of at least 100° C., preferably at least 150° C. and very particularly preferably at least 180° C. Preference is given here to polysulfones having a Vicat softening temperature VST/A/50 of from 180° C. to 230° C.

In addition, preference is given to polymers (B) which have a low solubility in phosphoric acid and/or are not degraded substantially by phosphoric acid. In a particular embodiment of the present invention, the weight decreases only insignificantly as a result of a treatment with 85% strength phosphoric acid. The weight ratio of the plate after the phosphoric acid treatment to the weight of the plate before the treatment is preferably greater than or equal to 0.8, in particular greater than or equal to 0.9 and particularly preferably greater than or equal to 0.95. This value is determined on a plate of polymer (B) which is 2 mm thick, 5 cm long and 2 cm wide. This plate is placed in phosphoric acid, with the weight ratio of phosphoric acid to the plate being 10. The phosphoric acid is subsequently heated at 100° C. for 24 hours while stirring. The plate is subsequently freed of excess phosphoric acid by washing with water and dried. The plate is then weighed again.

Preferred polymers include polysulfones, in particular polysulfone having aromatics in the main chain. In a particular embodiment of the present invention, preferred polysulfones and polyether sulfones have a melt flow rate MVR 300/21.6 of less than or equal to 40 cm³/10 min, in particular less than or equal to 30 cm³/10 min and particularly preferably less than or equal to 20 cm³/10 min, measured in accordance with ISO 1133.

The mixture obtained in step A) is, in step B), heated to a temperature of up to 400° C., in particular 350° C., preferably up to 280° C., in particular from 100° C. to 250° C. and particularly preferably the range from 200° C. to 250° C. An inert gas, for example nitrogen or a noble gas such as neon, argon, is used here.

Furthermore, it has been found that when using aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxy-phenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazole-dicarboxylic acid, 2,6-pyrimidinedicarboxylic acid, 2,5-pyrazinedicarboxylic acid, the temperature in step B) is advantageously in the range up to 300° C., preferably from 100° C. to 250° C.

In one variant of the process, the heating according to step B) can be carried out after the formation of a sheet-like structure according to step C).

The mixture prepared in step A) and/or step B) can further comprise organic solvents. These can have a positive influence on the processability. For example, the rheology of the solution can be improved in this way, so that it can be extruded or spread by means of a doctor blade more easily.

To achieve a further improvement in the use properties, fillers, in particular proton-conducting fillers, and additional acids can also be added to the membrane. The addition can be carried out, for example, in step A), step B) and/or step C). Furthermore, these additives can, if they are in liquid form, also be added after the polymerization in step D).

Nonlimiting examples of proton-conducting fillers are sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2P_2O_8$, $HSb_3P_2O_{14}$, $H_5Sb_5P_2O_{20}$, polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$, selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$, silicates such as zeolites, zeolites($NH_{4+}$), sheet silicates, framework silicates, H-natrolites, H-mordenites, $NH_4$-analcines, $NH_4$-sodalites, $NH_4$-gallates, H-montmorillonites, acids such as $HClO_4$, $SbF_5$, fillers such as carbides, in particular SiC, $Si_3N_4$, fibers, in particular glass fibers, glass powders and/or polymer fibers, preferably ones based on polyazoles.

These additives can be present in the proton-conducting polymer membrane in customary amounts, but the positive properties such as high conductivity, long life and high mechanical stability of the membrane should not be impaired too greatly by addition of excessively large amounts of additives. In general, the membrane after the treatment according to step D) comprises not more than 80% by weight, preferably not more than 50% by weight and particularly preferably not more than 20% by weight, of additives.

In addition, this membrane can further comprise perfluorinated sulfonic acid additives (preferably 0.1-20% by weight, more preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl, D.; Singh, S. Case Cent. Electrochem. Sci., Case West. Reserve Univ., Cleveland, Ohio, USA. J. Electrochem. Soc. (1989), 136(2), 385-90.) Nonlimiting examples of perfluorinated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexane-sulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

The formation of the sheet-like structure in step C) is effected by means of measures known per se from the prior art for polymer film production (casting, spraying, spreading by doctor blade, extrusion). Suitable supports are all supports which are inert under the conditions. The supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity, the solution can, if appropriate, be admixed with a volatile organic solvent. In this way, the viscosity can be set to the desired value and the formation of the membrane can be aided.

The thickness of the sheet-like structure obtained according to step C) is preferably from 10 to 4000 µpm, more preferably from 15 to 3500 µm, in particular from 20 to 3000 µm, particularly preferably from 30 to 1500 µm and very particularly preferably from 50 to 1200 µm.

The treatment of the membrane in step D) is carried out, in particular, at temperatures in the range from 0° C. to 150° C., preferably at temperatures from 10° C. to 120° C., in particular from room temperature (20° C.) to 90° C., in the presence of moisture or water and/or water vapor. The treatment is preferably carried out under atmospheric pressure, but can also be carried out under superatmospheric pressure. It is important that the treatment is carried out in the presence of sufficient moisture, as a result of which the polyphosphoric acid present is partially hydrolyzed to form low molecular weight polyphosphoric acid and/or phosphoric acid and thus contributes to strengthening of the membrane.

The partial hydrolysis of the polyphosphoric acid in step D) leads to strengthening of the membrane and to a decrease in the layer thickness and formation of a membrane. The strengthened membrane generally has a thickness in the range from 15 to 3000 µm, preferably from 20 to 2000 µm, in particular from 20 to 1500 µm, with the membrane being self-supporting.

The upper temperature limit for the treatment according to step D) is generally 150° C. In the case of extremely brief action of moisture, for example of superheated steam, this steam can also be hotter than 150° C. The duration of the treatment is critical in determining the upper temperature limit.

The partial hydrolysis (step D) can also be carried out in controlled temperature and humidity chambers so that the hydrolysis can be controlled in a targeted manner in the presence of a defined amount of moisture. Here, the humidity can be set in a targeted manner by means of the temperature or saturation of the environment in contact with the membrane, for example gases such as air, nitrogen, carbon dioxide or other suitable gases, with water vapor. The treatment time is dependent on the chosen values of the abovementioned parameters.

The treatment time is also dependent on the thickness of the membrane.

In general, the treatment time ranges from a few seconds to some minutes, for example under the action of superheated steam, or up to entire days, for example in air at room temperature and low relative atmospheric humidity. The treatment time is preferably in the range from 10 seconds to 300 hours, in particular from 1 minute to 200 hours.

If the partial hydrolysis is carried out at room temperature (20° C.) using ambient air at a relative atmospheric humidity of 40-80%, the treatment time is in the range from 1 to 200 hours.

The membrane obtained according to step D) can be self-supporting, i.e. it can be detached from the support without damage and subsequently, if appropriate, be directly processed further.

The concentration of phosphoric acid and thus the conductivity of the polymer membrane of the invention can be set via the degree of hydrolysis, i.e. the duration, temperature and ambient humidity. According to the invention, the concentration of phosphoric acid is reported as mol of acid per mol of repeating units in the polymer.

For the purposes of the present invention, a concentration (mol of phosphoric acid per mol of repeating units of the formula (III), i.e. polybenzimidazole) of from 10 to 80, in particular from 12 to 60, is preferred. Such high degrees of doping (concentrations) can be obtained only with difficulty, if at all, by doping of polyazoles with commercially available ortho-phosphoric acid.

Subsequent to the treatment according to step D) the membrane can be crosslinked by action of heat in the presence of oxygen. This hardening of the membrane effects an additional improvement in the properties of the membrane. For this purpose, the membrane can be heated to a temperature of at least 150° C., preferably at least 200° C. and particularly preferably at least 250° C. The oxygen concentration in this process step is usually in the range from 5 to 50% by volume, preferably from 10 to 40% by volume, without this constituting a restriction.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in the range from 5 to 200 kGy.

Depending on the desired degree of crosslinking, the duration of the crosslinking reaction can vary within a wide range. In general, this reaction time is in the range from 1 second to 10 hours, preferably from 1 minute to 1 hour, without this constituting a restriction.

The polymer membrane of the invention displays improved materials properties compared to the previously known doped polymer membranes. In particular, it displays improved power compared to known doped polymer membranes. This is due, in particular, to an improved proton conductivity. At a temperature of 120° C., this is at least 0.1 S/cm, preferably at least 0.11 S/cm, in particular at least 0.12 S/cm.

If the membranes of the invention comprise polymers having sulfonic acid groups, the membranes display a high conductivity even at a temperature of 70° C. The conductivity is dependent, inter alia, on the sulfonic acid group content of the membrane. The higher this proportion, the better the conductivity at low temperatures. A membrane according to the invention can be moistened at low temperatures. For this purpose, the compound used as energy source, for example hydrogen, can, for example, be provided with a proportion of water. However, the water formed by the reaction is in many cases sufficient to achieve moistening.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model comprising a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

In a particular embodiment of the present invention, the membranes have a high mechanical stability. This parameter is given by the hardness of the membrane which is determined by means of microhardness measurement in accordance with DIN 50539. For this purpose, the membrane is gradually loaded with a Vickers diamond up to a force of 3 mN over a period of 20 s and the penetration depth is determined. According to this, the hardness at room temperature is at least 5 mN/mm$^2$, preferably at least 50 mN/mm$^2$ and very particularly preferably at least 200 mN/mm$^2$, without this constituting a restriction. The force is subsequently kept constant at 3 mN for 5 s and the creep is calculated from the penetration depth. In the case of preferred membranes, the creep $C_{HU}$ 0.003/20/5 under these conditions is less than 30%, preferably less than 15% and very particularly preferably less than 5%. The modulus determined by means of microhardness measurement YHU is at least 0.1 MPa, in particular at least 2 MPa and very particularly preferably at least 5 MPa, without this constituting a restriction.

Possible fields of use of the polymer membranes of the invention include, inter alia, use in fuel cells, in electrolysis, in capacitors and in battery systems.

The present invention also provides a membrane-electrode unit comprising at least one polymer membrane according to the invention. For further information on membrane-electrode units, reference may be made to the specialist literature, in particular the patents U.S. Pat. Nos. 4,191,618, 4,212,714 and 4,333,805. The disclosure of the abovementioned references [U.S. Pat. Nos. 4,191,618, 4,212,714 and 4,333,805] in respect of the structure and the production of membrane-electrode units and also the electrodes, gas diffusion layers and catalysts to be selected is incorporated by reference into the present description.

In one variant of the present invention, the membrane formation can be carried out directly on the electrode rather than on a support. The treatment according to step D) can in this way be correspondingly shortened, since it is no longer necessary for the membrane to be self-supporting. Such a membrane is also provided by the present invention.

The present invention further provides an electrode provided with a proton-conducting polymer coating which comprises polyazole blends and is obtained by a process comprising the steps A) preparation of a mixture comprising polyphosphoric acid, at least one polyazole (polymer A) and/or one or more compounds which are suitable for forming polyazoles under the action of heat according to step B),
B) heating of the mixture obtainable according to step A) under inert gas to temperatures of up to 400° C.,
C) application of a layer using the mixture from step A) and/or B) to an electrode,
D) treatment of the membrane formed in step C), wherein at least one further polymer (polymer B) which is not a polyazole is added to the composition obtainable according to step A) and/or step B) and the weight ratio of polyazole to polymer B is in the range from 0.05 to 10.

For the sake of completeness, it may be noted that all preferred embodiments of a self-supporting membrane apply analogously for a membrane applied directly to the electrode.

In a particular embodiment of the present invention, the coating has a thickness of from 2 to 3000 μm, preferably from 2 to 2000 μm, in particular from 3 to 1500 μm, particularly preferably from 5 to 500 μm and very particularly preferably from 10 to 200 μm, without this constituting a restriction.

The treatment according to step D) leads to a hardening of the coating. The treatment is carried out until the coating has a hardness which is sufficient for it to be able to be pressed to produce a membrane-electrode unit. A sufficient hardness is ensured when a membrane which has been treated in this way is self-supporting. However, a lower hardness is sufficient in many cases. The hardness determined in accordance with DIN 50539 (microhardness measurement) is generally at least 1 mN/mm$^2$, preferably at least 5 mN/mm$^2$ and very particularly preferably at least 50 mN/mm$^2$, without this constituting a restriction.

An electrode which has been coated in this way can be installed in a membrane-electrode unit which, if appropriate, has at least one polymer membrane according to the invention.

In a further variant, a catalytically active layer can be applied to the membrane according to the invention and this catalytically active layer can be joined to a gas diffusion layer. For this purpose, a membrane is formed according to steps A) to D) and the catalyst is applied. These structures are also provided by the present invention.

Furthermore, the formation of the membrane according to steps A) to D) can also be carried out on a support or a support film on which the catalyst is present. After removal of the support or the support film, the catalyst is present on the membrane according to the invention. These structures are also provided by the present invention.

The present invention likewise provides a membrane-electrode unit which has at least one coated electrode and/or at least one polymer membrane according to the invention in combination with a further polymer membrane based on polyazoles or a polymer blend membrane comprising at least one polymer based on polyazoles.

EXAMPLE

Preparation of p-PBI solution

Terephthalic acid (12.4598 g, 0.075 mol) and 3,3',4,4'-tetraaminobiphenyl (16.074 g, 0.075 mol) together with 650 g of polyphosphoric acid (PPA) were placed under N$_2$ in a three-neck flask. The reaction mixture was polymerized at 220° C. for 24 hours while stirring.

Part of the solution was precipitated in H$_2$O, and the solid was washed with ammonium hydroxide and water. The polymer was subsequently dried at 100° C. under reduced pressure for 24 hours. The intrinsic viscosity of p-PBI was 2.9 g/dl at a polymer solution concentration of 0.2 g/dl in concentrated sulfuric acid.

S-PEK

Polyether ketone (PEK) ($M_w$: 144100, $M_n$: 55000) was dissolved in sulfuric acid and sulfonated by addition of oleum at 50° C. The reaction mixture was precipitated in water, neutralized, filtered and the solid was dried at 100° C. under reduced pressure for 24 hours. The degree of sulfonation of the s-PEK is 57.3%.

Blends and Membrane Production p-PBI/PPA was heated to 150° C. under an N$_2$ atmosphere. 94.22 g of p-PBI/PPA solution were placed in a three-neck flask and 16.0 g of S-PEK and 95 g of PPA were added to the p-PBI/PPA solution. The blend solution was stirred at 150° C. under an N$_2$ atmosphere for 20 hours. The solution was subsequently spread on a glass plate by means of a doctor blade at elevated temperature and hydrolyzed.

The conductivity of the membrane produced in this way was determined at various temperatures, and the data obtained are shown in FIG. 1.

The invention claimed is:

1. A proton-conducting polymer membrane which comprises polyazole blend and is obtained by a process (1) or (2) wherein process (1) comprises the steps
    A1) preparation of a mixture comprising polyphosphoric acid, at least one polyazole (polymer A) and/or one or more compounds which are suitable for forming polyazoles under the action of heat according to step B1),
    B1) heating of the mixture obtained according to step A1) under inert gas to temperatures of up to 400° C.,
    C1) application of a layer using the mixture step B1) to a support to form a sheet-like structure,
    D1) treating said sheet-like structure formed in step C1) with hydrolysis until it is self-supporting,
    or wherein process (2) comprises the steps
    A2) preparing a mixture comprising
        polyphosphoric acid,
        at least one polyazole (polymer A) and/or one or more compounds which are suitable for forming polyazoles under the action of heat according to step C2),
    B2) applying a layer using the mixture from step A2) to a support to form a sheet-like structure,
    C2) heating of the sheet-like material obtained according to step B2) under inert gas to temperatures of up to 400° C.,
    D2) treating the sheet-like structure in step C2) with hydrolysis until it is self-supporting,
    wherein at least one further polymer (polymer B) which is not a polyazole is added to the composition obtained according to step A1) or A2) and the weight ratio of polyazole to polymer B is in the range from 0.1 to 50.

2. The membrane as claimed in claim 1, wherein the mixture prepared in step A1 or step A2) comprises compounds which are suitable for forming polyazoles under the action of heat in step B1) or step C2), with these compounds comprising one or more aromatic and/or heteroaromatic tetraamino compounds and one or more aromatic and/or heteroaromatic carboxylic acids or derivatives thereof which have at least two acid groups per carboxylic acid monomer and/or one or more aromatic and/or heteroaromatic diaminocarboxylic acids.

3. The membrane as claimed in claim 1, wherein the mixture prepared in step A1 or step A2) comprises compounds which are suitable for forming polyazoles under the action of heat in step B1) or step C2), with these compounds being obtainable by reaction of one or more aromatic and/or heteroaromatic tetraamino compounds with one or more aromatic and/or heteroaromatic carboxylic acids or derivatives thereof which have at least two acid groups per carboxylic acid monomer or of one or more aromatic and/or heteroaromatic diaminocarboxylic acids in the melt at temperatures of up to 400° C.

4. The membrane as claimed in claim 2, characterized in that aromatic and/or heteroaromatic tetraamino compounds used as compounds suitable for forming polyazoles comprise compounds selected from the group consisting of 3,3',4,4'-tetraaminobiphenyl, 2,3,5,6-tetraaminopyridine and 1,2,4,5-tetraaminobenzene.

5. The membrane as claimed in claim 2, characterized in that aromatic and/or heteroaromatic carboxylic acids or derivatives thereof having at least two acid groups per carboxylic acid monomer used as compounds suitable for forming polyazoles comprise compounds selected from the group consisting of isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3 dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterphthalic acid, tetrafluorophthalic acid, tetrafluoroisophthalic acid, tetrafluoroterephthalic acid, 1,4-naphthalenedicarboxylic acid, 1,5-naplithalenedicarboxylic acid, 2,6-naphthalenedicarboxylic acid, 2,7-naphthalenediocarboxylic acid, diphenic acid, 1,8-dihydroxynaphthalene-3,6-dicarboxylic acid, bis(4-carboxyphenyl) ether, benzophenone-4,4'-dicarboxyic acid, bis(4-dicarboxyphenyl) sulfone, biphenyl-4,4'-dicarboxylio acid, 4-trifluoromethylphthalic acid, 2,2-bis(4-carboxyphenyl) hexafluoropropane, 4,4'-stilbenedicarboxylic acid, 4-carboxyciintamic acid, their C1-C20-alkyl esters, their C5-C12-aryl esters, their acid anhydrides and their acid chlorides.

6. The membrane as claimed in claim 2 characterized in that the compounds suitable for forming polyazoles comprise aromatic tricarboxylic acids, their C1-C20-alkyl esters or C5-C12-aryl esters or their acid anhydrides or their acid halides or tetracarboxylic acids, their C1-C20-alkyl esters or C5-C12-aryl esters or their acid anhydrides or their acid halides.

7. The membrane as claimed in claim 6, characterized in that the aromatic tricarboxylic acids comprise compounds selected from the group consisting of 1,3,5-benzenelricarboxylic acid (trimesic acid); 2,4,5-benzenetricarboxylic acid (trimellitic acid); 2-carboxyphenyl) iminodiacetic acid, 3,5, 3'-biphenyltricarboxylic acid; 3,5,4'-biphenyltricarboxylic acid, 2,4,6-pyridinetricarboxylic acid, benzene-1,2,4,5-tetracarboxylic acid; naphthalene-1,4,5,8-tetracarboxylic acid, 3,5,3',5'-biphenyltetracarboxylic acid, benzophenonetetracarboxylic acid, 3,3',4,4'biphenyltetracarboxylic acid, 2,2', 3,3'-biphenyltetracarboxylic acid, 1,2,5,6-naphthalenetetracarboxylic acid and 1,4,5,8-naphthalenetetracarboxylic acid.

8. The membrane as claimed in claim 6, characterized in that the content of tricarboxylic acid and/or tetracarboxylic acids is from 0 to 30 mol based on dicarboxylic acid used.

9. The membrane as claimed in claim 2, characterized in that the compounds suitable for forming polyazoles comprise heteroaromatic dicarboxylic acids, tricarboxylic acids and/or tetracarboxylic acids which contain at least one nitrogen, oxygen, sulfur or phosphorus atom in the aromatics.

10. The membrane as claimed in claim 9, characterized in that pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides are used.

11. The membrane as claimed in claim 2, characterized in that the compounds suitable for forming polyazoles comprise diaminobenzoic acid and/or its monohydrochloride and dihydrochloride derivatives.

12. The membrane as claimed in claim 1, wherein the polymer B) is used in step A1) or A2) in an amount in the range from 10 to 50% by weight, based on the weight of the mixture A) and/or B).

13. The membrane as claimed in claim 1, characterized in that the polymer B) comprises at least one polyolefin.

14. The membrane as claimed in claim 1, characterized in that the polymer B) comprises at least one polymer having C—O bonds.

15. The membrane as claimed in claim 1, characterized in that the polymer B) comprises at least one polymer having C—S bonds.

16. The membrane as claimed in claim 1, characterized in that the polymer B) comprises at least one polymer having C—N bonds.

17. The membrane as claimed in claim 1, characterized in that the polymer B) comprises at least one inorganic polymer.

18. The membrane as claimed in claim 1, characterized in that the polymer B) comprises at least one sulfonated polymer.

19. The membrane as claimed in claim 1, characterized in that the heating according to step C2) is carried out after the formation of a sheet-like structure according to step B2).

20. The membrane as claimed in claim 1, characterized in that the treatment according to step D1) or step D2) is carried out at temperatures in the range from 0° C. to 150° C. in the presence of moisture.

21. The membrane as claimed in claim 1, characterized in that the treatment of the membrane in step D1) or step D2) is carried out for from 10 seconds to 300 hours.

22. The membrane as claimed in claim 1, characterized in that the membrane formed after step D1) or step D2) is crosslinked by action of oxygen.

23. The membrane as claimed in claim 1, characterized in that a layer having a thickness of from 20 to 4000 µm is produced in step C1) or step B2).

24. The membrane as claimed in claim 1, characterized in that the membrane formed after step D1) or step D2) has a thickness of from 15 to 3000 µm.

25. A proton-conducting polymer membrane which comprises polyazole blend and is obtained by a process (1) or (2) wherein the process (1) comprising the steps A1) preparing a mixture comprising
polyphosphoric acid,
at least one polyazole (polymer A) and/or one or more compounds which are suitable for forming polyazoles under the action of heat according to step B1),
B1) heating of the mixture obtained according to step A1) under inert gas to temperatures of up to 400° C.,
C1) applying a layer using the mixture from step A1) and/or B1) to a support to form a sheet-like structure, D1) treating the sheet-like structure formed in step C1) with hydrolysis until it is self-supporting, or wherein process (2) comprises the steps A2) preparing a mixture comprising polyphosphoric acid,
   at least one polyazole (polymer A) and/or one or more compounds which are suitable for forming polyazoles under the action of heat according to step C2), B2) applying a layer using the mixture from step A2) to a support to form a sheet-like structure, C2) heating of the sheet-like material obtained according to step B2) under inert gas to temperatures of up to 400°C., D2) treating the sheet-like structure formed in step C2) with hydrolysis until it is self-supporting, wherein at least one further polymer (polymer B) and wherein said polymer B comprises a) at least one polyolefin,
b) at least one polymer having C—O bonds,
c) at least one polymer having C—S bonds,
d) at least one polymer having C—N bonds,
e) at least one inorganic polymer or
f) at least one sulfonated polymer and said polymer B is added to the composition obtained according to step A1) or step A2) and/or step B1) and the weight ratio of polyazole to polymer B is in the range from 0.1 to 50.

26. The membrane as claimed in claim 25, wherein the hydrolysis strengthens the membrane and is carried out in a temperature from 0 to 150° C. at atmospheric or superatmospheric pressure and the membrane has a thickness of 15 to 3,000 μm and the hydrolysis is carried out until the membrane has a hardness of at least 1 mN/mm².

27. The membrane as claimed in claim 25, wherein the hydrolysis is carried out from 20 to 90° C. in the presence of water and/or water vapor and the membrane has a thickness of 20 to 1,500 μm and the hydrolysis is carried out until the membrane has a hardness of at least 50 mN/mm².

* * * * *